Sept. 22, 1959 A. G. LACEFIELD ET AL 2,905,158
ENGINE COOLING SYSTEM
Filed Dec. 9, 1957 3 Sheets-Sheet 1

INVENTORS
A. G. LACEFIELD &
W. B. SORENSON
BY
ATTORNEY

Sept. 22, 1959 A. G. LACEFIELD ET AL 2,905,158
ENGINE COOLING SYSTEM
Filed Dec. 9, 1957 3 Sheets-Sheet 3

INVENTORS
A. G. LACEFIELD &
W. B. SORENSON
BY
*Jerry J Dunlap*
ATTORNEY

United States Patent Office 2,905,158
Patented Sept. 22, 1959

2,905,158
ENGINE COOLING SYSTEM
Arlie G. Lacefield and William B. Sorenson, Oklahoma City, Okla.
Application December 9, 1957, Serial No. 701,599
3 Claims. (Cl. 123—41.1)

This invention relates to improvements in water type cooling systems for engines, and more particularly, but not by way of limitation, to an improved control and by-pass for a water cooling system of the type used on internal combustion engines.

An important object of this invention is to increase the efficiency of internal combustion engines, particularly in the initial periods of operation of the engines.

Another object of this invention is to provide a water cooling system for an engine wherein the water by-passes the radiator of the system and circulates only through the water jacket around the engine while the engine is being warmed up.

A further object of this invention is to provide a novel control and by-pass in a water cooling system for an engine, wherein the water is circulated in different paths, depending upon the temperature of the water.

Another object of this invention is to provide a novel control and by-pass for a water type cooling system for engines, wherein the water is gradually diverted from the by-pass through the radiator of the system as the engine reaches normal operating temperatures, without restricting flow of the water through the system.

A still further object of this invention is to provide a precise control of the temperature of the water used in cooling an engine.

Another object of this invention is to provide a water cooling system for engines which is simple in construction and may be economically manufactured.

Other objects and advantages of the invention will be evident from the following detailed description, when read in conjunction with the accompanying drawings which illustrate our invention.

Figure 1:
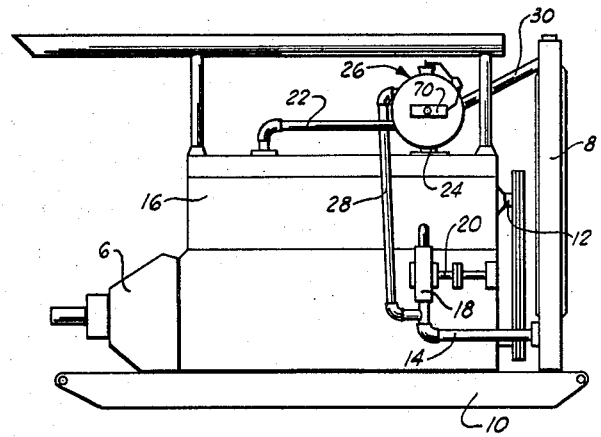
Figure 1 is a schematic elevational view of an internal combustion engine and a cooling system constructed in accordance with this invention.
Figure 2:
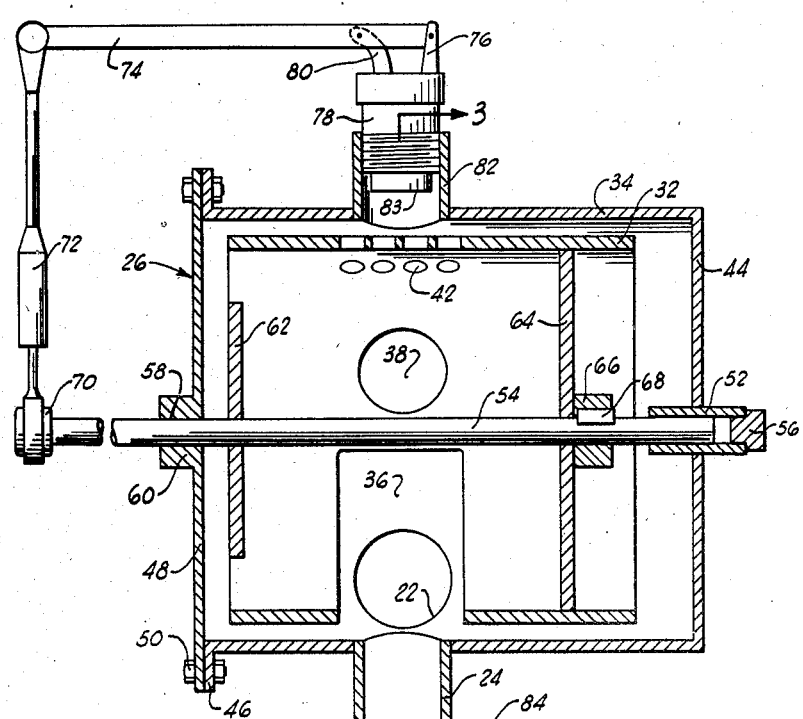
Figure 2 is a vertical sectional view taken along the longitudinal axis of the novel control unit of our system.

Referring to the drawings in detail, and particularly Fig. 1, reference character 6 designates any suitable type of engine, such as a gas or diesel engine used in the drilling industry. A suitable radiator 8 is secured on the base 10 of the engine 6 at one end of the engine and is utilized to cool the water used in cooling the engine 6 in the usual fashion. A suitable fan (not shown) is normally provided adjacent the radiator 8 and driven by a shaft 12 extending from the respective end of the engine. A conduit 14, sometimes hereinafter referred to as an inlet conduit, is connected between the lower portion of the radiator 8 and the lower portion of a suitable water jacket 16 surrounding the upper portions of the engine 6. It will be understood that the water jacket 16 may take any desired form and surround any desired portion of the engine 6.

A suitable water pump 18 is interposed in the inlet conduit 14 to pump water from the lower portion of the radiator 8 into the lower portion of the water jacket 16. The pump 18 is driven by a stub shaft 20 extending alongside the engine 6 and operates simultaneously with the engine 6. Outlet conduits 22 and 24 extend from the upper portion of the water jacket 16 into connection with a novel control unit generally designated by reference character 26. It will also be observed that a by-pass conduit 28 is connected at its upper end to one side of the unit 26 and at its lower end to the inlet conduit 14 upstream of the pump 18. A return conduit 30 is connected at one end thereof to the side of the control unit 26 opposite the by-pass 28 and at its opposite end to the upper portion of the radiator 8.

Figure 3:
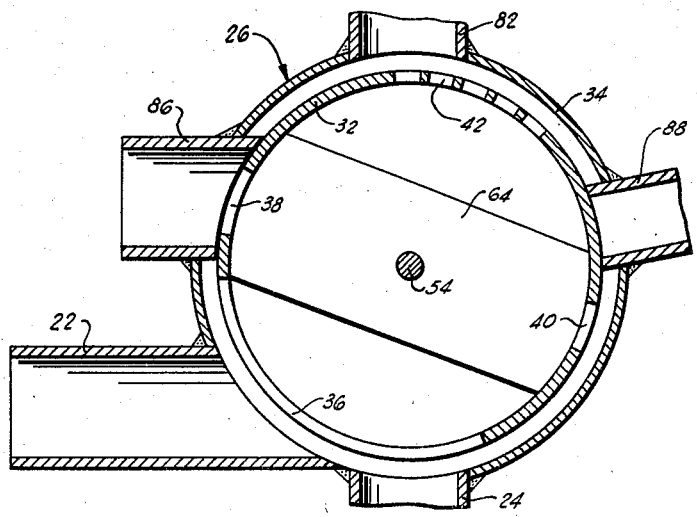
Figure 3 is a transverse sectional view of the control unit, with the thermostat assembly removed, as taken along lines 3—3 of Fig. 2.
Figure 4:
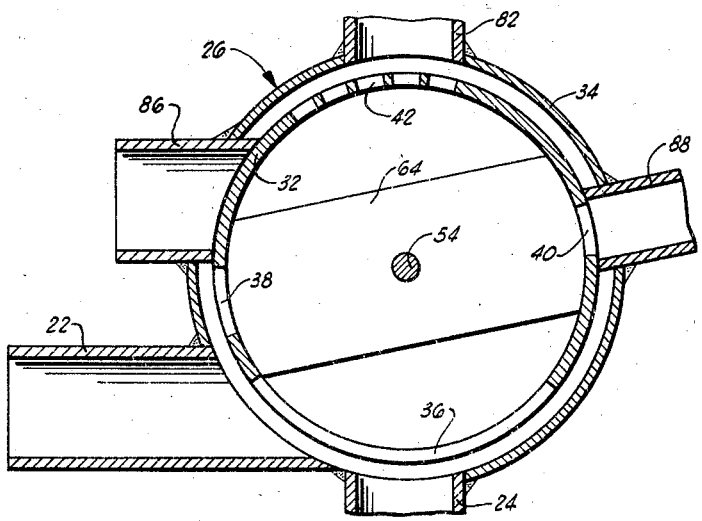
Figure 4 is a view similar to Fig. 3, but illustrating a second position of the control rotor of the control unit.
Figure 5:
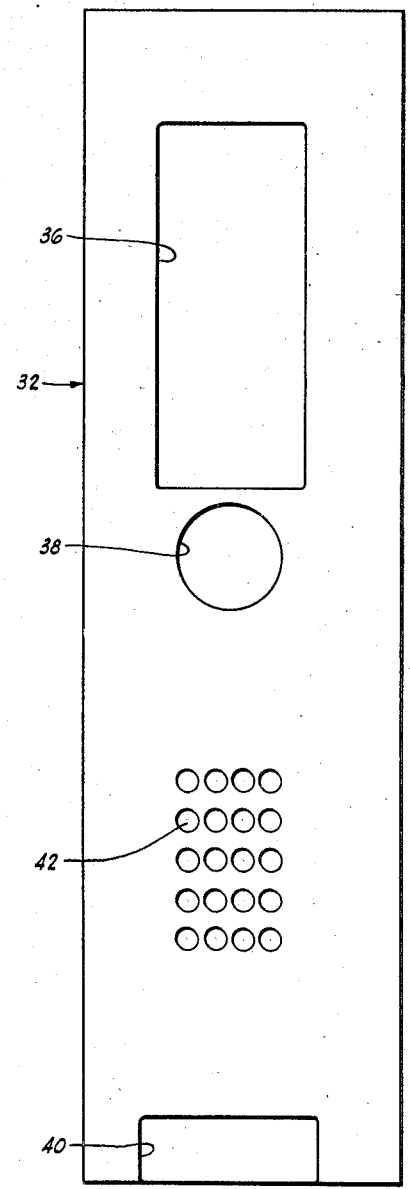
Figure 5 is a layout of the control rotor, as if the rotor were split and rolled out on a flat surface, to illustrate the shapes of the openings through the rotor.

The control unit 26 is shown in detail in Figs. 2 through 5 and includes a hollow rotor 32 rotatably supported in a tubular shaped housing 34. The rotor 32 may easily be formed by bending an elongated plate into circular form and welding the ends of the plate together to form the completed circular shaped hollow member. A plurality of openings are provided through the sides of the rotor 32, as is best shown in Fig. 5. One of the openings 36 is rectangular in form and extends a substantial distance around the circumference of the rotor. A circular shaped opening or aperture 38 is provided through the rotor adjacent one end of the large opening 36. Another rectangular shaped opening 40 is provided through the rotor 32 at the opposite end of the larger opening 36. The rectangular opening 40 is substantially smaller than the opening 36, for purposes which will hereinafter be set forth. A plurality of closely spaced apertures 42 are provided through the rotor 32 substantially half-way between the openings 38 and 40. It will thus be observed that the completed rotor 32 has four different types and sizes of openings in circumferentially spaced relation around the periphery of the rotor. These various openings are provided to control the flow of cooling water through the unit 26, as will be more fully hereinafter set forth.

The tubular housing 34 (Fig. 2) is closed at one end 44 by an end member preferably formed integrally with the walls of the housing. The opposite end of the housing 34 is provided with an outwardly extending circumferential flange 46 to receive a circular shaped cover 48. Circumferentially spaced apertures (not shown) are provided in the cover 48 and the flange 46 to receive a plurality of bolts 50 which tightly secure the cover 48 on the housing 34. It will also be understood that any desired sealing means (not shown) may be provided between the mating faces of the cover 48 and the flange 46 to provide a fluid tight seal of the cover 48 on the housing.

A suitable bushing 52 is secured in a complementary aperture in the center of the housing end wall 44 to rotatably support one end of a longitudinally extending shaft 54. Also, we prefer to provide a freeze plug 56 in the outer end of the bushing 52 to seal the outer end of the bushing, as well as function in the normal manner of a freeze plug to prevent rupture of the housing 34 in the event of water freezing in the housing. The shaft 54 extends lengthwise through the center of the housing 34 and through an aperture 58 in the center of the cover 48. A suitable hub 60 is preferably provided on the outer face of the cover 48 around the aperture 58 to rotatably support the shaft 54.

The shaft 54 is utilized to support the rotor 32 centrally in the housing 34, and for this purpose, we prefer to use plates 62 and 64 adjacent the ends of the rotor. The plate 62 may be simply apertured to receive the shaft 54 and maintain the respective end of the rotor 32 concentric with the shaft. The opposite plate 64 is preferably provided with a hub 66 on one face thereof around the shaft 54. The hub 66 is secured to the shaft 54 by a key 68 and suitable keyways in the hub 66 and the outer periphery of the shaft 54, whereby the rotor 32 is turned by turning the shaft 54. It should also be noted that the plates 62 and 64 may be substantially rectangular in form, as illustrated in Fig. 3, and need not completely close off the opposite ends of the rotor.

A lever 70 (Figs. 1 and 2) is secured on the outer end of the shaft 54 in front of the cover 48 of the housing 34. The lever 70 is connected by a suitable linkage 72 to the forward end of a vertically movable lever 74 located above the housing 34. The linkage 72 is preferably adjustable in length to permit adjustment between the ends of the levers 70 and 74 and control the turning movement of the rotor 32, as will be more fully hereinafter set forth. The opposite end of the lever 74 is pivotably secured to a stationary bracket 76 extending upwardly from a thermostat assembly 78. The thermostat assembly 78 may be of any desired type which has a member 80 thereon movable with changes in temperature of the thermostat assembly 78. A typical thermostat assembly which may be used is the Vernatherm-type J-U-A-3238 sold by the Detroit Lubricator Company. The upper end of the member 80 is pivotally secured to the lever 74 between the bracket 76 and the linkage 72 to provide vertical movement of the outer end of the lever 74 and operation of the rotor 32 upon movement of the member 80. The thermostat assembly 78 is secured in a coupling 82 extending through the wall of the housing 34 in such a manner that water present in the upper portion of the housing will contact the temperature bulb 83 on the lower end of the thermostat assembly 78 and provide movement of the member 80 upon changes in temperature of the water in the housing. In the preferred construction, the coupling 82 is secured in the crown of the housing 34, principally for convenience in access to the thermostat assembly 78.

The control unit 26 may be supported on the engine 6 in any desired manner, but I prefer to use the outlet 24. The conduit 24 is secured in the lower portion of the housing 34 and is provided with a suitable flange 84 on the lower end thereof which may be bolted to the top of the water jacket 16 around the respective outlet aperture (not shown) from the water jacket. The outlet 24 may be either threaded into the housing 34 or welded to the housing in any desired manner, such that the conduit 24 will communicate with the interior of the housing. The other outlet conduit 22 (Fig. 3) is also secured to the lower portion of the housing 34, and is preferably secured closely adjacent to the outlet conduit 24. As will be apparent to those skilled in the art, the outlet conduit 22 may be secured directly to the housing 34 to communicate with the interior of the housing, but, preferably, a coupling (not shown) is secured in the wall of the housing 34 and connected to the end of the outlet conduit 22 to facilitate the assembly of the cooling system.

Two connectors 86 and 88 extend through the walls of the housing 34 in substantially diametrically opposed relation above the outlet conduits 22 and 24. Each of the connectors 86 and 88 is suitably secured to the housing 34, as by welding, and extends inwardly into sliding contact with the outer periphery of the control rotor 32. It will also be observed that the inner end of each of the connectors 86 and 88 is curved on the arc of a circle corresponding to the outer periphery of the rotor 32, such that a substantially fluid tight seal will be provided all the way around the inner end of each of the connectors when they are in contact with a solid portion of the rotor 32. The connector 86 is provided for connection with the upper end of the by-pass conduit 28 and is preferably circular in form to mate with the small circular opening 38 of the control rotor 32, as will be more fully hereinafter set forth. The opposite connector 88 is preferably rectangular in cross-section to mate with the small rectangular opening 40 in the control rotor 32, but is converted to cylindrical form at its outer end for convenient connection with the return conduit 30 in the manner shown in Fig. 1.

*Operation*

In the embodiment shown herein, it will be assumed that the thermostat assembly 78 is of a type which provides an upward movement of the member 80 when the thermometer bulb 83 is heated, and the linkage 72 is connected to the lever 70 such that the rotor will be turned counter-clockwise (as viewed in Fig. 1 and Figs. 3 and 4) when the member 80 is moved upwardly. In assembling the apparatus, the linkage 72 is adjusted and the rotor 32 is placed in the position shown in Fig. 3 when the engine cooling water is cold, as when the engine has been out of operation for a substantial period in cold weather.

When the engine 6 is started, the pump 18 is placed in operation to provide a circulation of water through the cooling system. With the rotor 32 in the position shown in Fig. 3, the cooling water will be circulated through the water jacket 16 and out through the outlet conduits 22 and 24, then through the large opening 36 into the rotor 32. And, since the opening 40 is below the connection 88 to the return conduit 30, the water will be discharged from the control unit 26 through the opening 38, connector 86 and by-pass 28 back to the inlet of the pump 18. Thus, the cooling water is almost constanlty exposed to the water jacket 16 to provide a fast heating of the water and a minimum warm-up period for the engine 6.

As the engine 6 becomes warm, the cooling water also will be warmed to increase the temperature of the bulb 83 of the thermostat assembly 78 and raise the member 80. It will be observed that the water flowing through the rotor 32 will be circulated through the apertures 42 into contact with the bulb 83 on the lower end of the thermostat assembly 78 to increase the temperature of the bulb 83 as the temperature of the cooling water is increased. An upward movement of the member 80 is transmitted through the lever 74, linkage 72, lever 70 and shaft 54 to gradually turn the rotor 32 counter-clockwise. The lengths of the levers 74 and 70 will be designed to provide a counter-clockwise movement of the rotor 32 to the position shown in Fig. 4 when the member 80 has been moved to its uppermost position, which will occur when the maximum desired temperature of the cooling water has been reached.

In the position of the rotor 32 shown in Fig. 4, it will be observed that cooling water flowing through the outlet conduits 22 and 24 will enter the rotor 32 through the large opening 36, as well as through the small opening 38. This water will then be discharged from the control unit 26 through the opening 40 and the connector 88, since the opening 38 is below the connector 86. Thus, the cooling water will be circulated through the radiator 8 in the normal fashion to provide a cooling of the water and control of the temperature of the engine 6.

As the rotor 32 is turned by an increase in temperature of the cooling water, the opening 38 is moved downwardly to gradually close the connector 86, and the opening 40 is moved upwardly to gradually open the connector 88. An important feature of the present system is that the openings 38 and 40 are arranged with respect to the connectors 86 and 88 such that when the cooling water is between a predetermined minimum and a predetermined maximum temperature, both of the connectors 86 and 88 will be partially open to provide a free circulation of water through the cooling system. It may be noted that the outlet conduit 30 is normally larger in diameter than the by-pass conduit 28, and the opening 40 should be sufficiently large to prevent a restriction of the outlet 30. In this event, the opening 40 may be shaped rectangularly (as shown), with the short side of the opening extending circumferentially around the rotor 32 to limit the movement of the rotor required to open the connector 88, and yet provide the necessary size of opening.

After the engine 6 has warmed up to a predetermined temperature, a portion of the cooling water is by-passed through the by-pass 28 and a portion is circulated through the radiator 8 to provide a gradual warming of the water previously standing in the radiator 8 and prevent the injection of a large charge of cold water into the cooling jacket 16. Injection of a sudden charge of cold water into the water jacket of an engine, as occurs in thermostat controlled systems wherein the by-pass is closed and opened suddenly, creates condensation within the engine cylinders and substantially decreases the service life of the engine.

As previously indicated, the inner ends of the connectors 86 and 88 are preferably shaped to provide a sliding contact of the inner end of these connectors against the outer periphery of rotor 32 to minimize the leakage of cooling water into either of the connectors when it is in contact with a solid portion of the rotor. A precise seal between the rotor 32 and the connectors 86 and 88 is not required, since when one of the connectors is closed, the other connector is fully opened and the great majority of the cooling water will flow through the fully opened connector. However, a sliding fit between the connectors and the rotor 32 is desirable. Therefore, the outer periphery of the rotor 32 may be coated with a bearing type of material such as brass, between the openings 36 and 38 and the opening 36 and 40, as well as between the opening 38 and the adjacent apertures 42 and the opening 40 and adjacent apertures 42. The area of the rotor 32 around the apertures 42 need not be plated, since this area never comes in contact with either of the connectors 86 or 88.

Another feature of note in the present system is that the thermostat assembly 78 is not completely immersed in the cooling water, as in many present day systems. In the present system, only a sufficient portion of the thermostat assembly 78 (the thermometer bulb 83) is exposed to the cooling water to provide an efficient heat transfer from the cooling water to the temperature responsive elements in the thermostat. Thus, corrosion of the thermostat assembly is reduced to a minimum.

From the foregoing it will be apparent that the present invention will increase the efficiency of an engine, particularly while the engine is being warmed-up to the normal operating temperature. During the warm-up of the engine, in cold weather, the cooling water is initially circulated only through the cooling jacket of the engine, then partially through the radiator of the system and partially directly through the cooling water jacket, and finally all of the water is circulated through the radiator when the engine reaches normal operating temperature. Condensation in an engine utilizing the present system will be reduced to a minimum. It will also be apparent that the cooling system is simple in construction, will have a long service life and may be economically manufactured.

Changes may be made in the combination and arrangement of parts or elements as heretofore set forth in the specification and shown in the drawings without departing from the spirit and scope of the invention as defined in the following claims.

We claim:

1. Apparatus for controlling the flow of the cooling medium in an engine cooling system from the engine water jacket to the radiator and radiator bypass, comprising a tubular housing closed at its opposite ends, an opening in a side of the housing forming an inlet to the housing for the cooling medium discharging from the engine water jacket, a pair of tubular connectors extending into the housing in circumferentially spaced relation from each other and from the inlet for connection with the radiator and radiator bypass, a tubular rotor rotatably secured in the housing for rotation around the longitudinal axis of the housing, the inner end of each of said connectors being curved to slidingly fit against the outer surface of the rotor, said rotor having a large opening in a side thereof for mating with the inlet in all operating positions of the rotor and two smaller openings therein on opposite sides of the larger opening for said connectors arranged to alternately open said connectors in first and second positions of the rotor and partially open both of said connectors in positions of the rotor between said first and second positions, and means for turning the rotor between said first and second positions in accordance with the temperature of the cooling medium.

2. Apparatus as defined in claim 1 characterized further to include a coupling secured in a side of the housing in circumferentially spaced relation from said connectors and inlet, and wherein said means for turning the rotor comprises a thermostat secured in said coupling and having a portion thereof movable in response to the temperature of the cooling medium in the housing, and a linkage connecting the movable element of the thermostat to the rotor.

3. Apparatus as defined in claim 2 wherein said rotor has a plurality of apertures therein between said smaller openings to facilitate circulation of the cooling medium around the thermostat.

References Cited in the file of this patent

UNITED STATES PATENTS

| Re. 16,676 | Muir | July 12, 1927 |
| 1,330,700 | Giesler | Feb. 10, 1920 |
| 1,558,009 | Giesler | Oct. 20, 1925 |
| 1,828,978 | Coe | Oct. 27, 1931 |
| 2,070,615 | Plante | Feb. 16, 1937 |